(No Model.)
J. CARPENTER.
COMBINED CUTTING TOOL.
No. 541,963. Patented July 2, 1895.
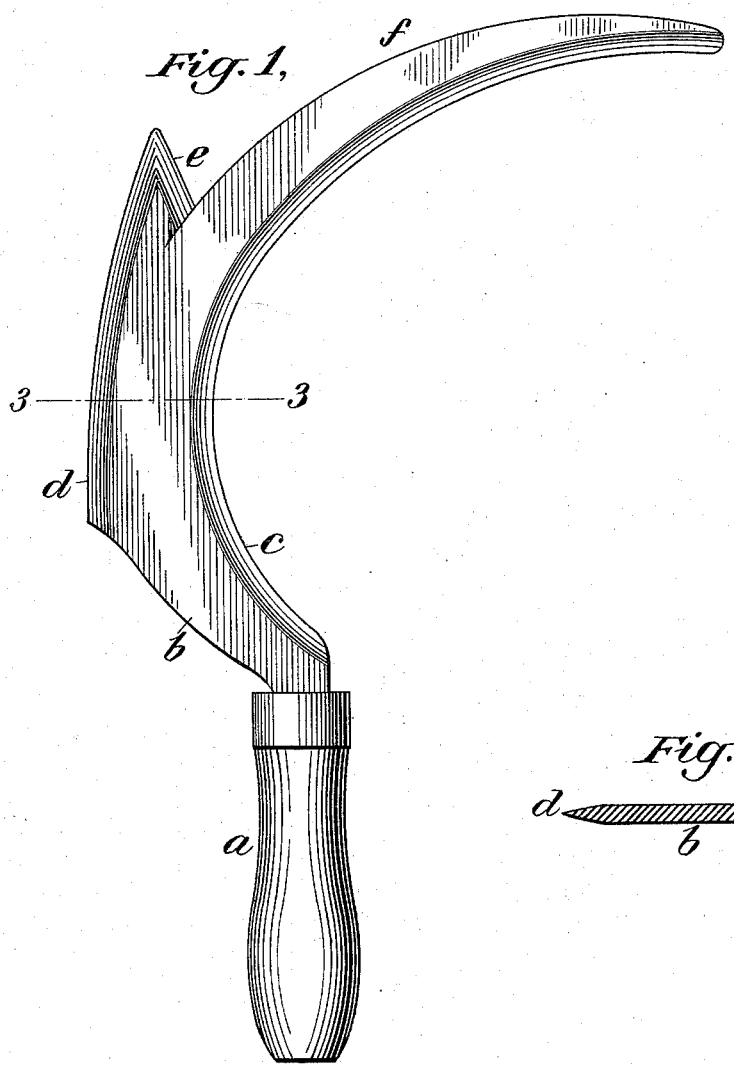
Fig. 1.
Fig. 3.
Fig. 2
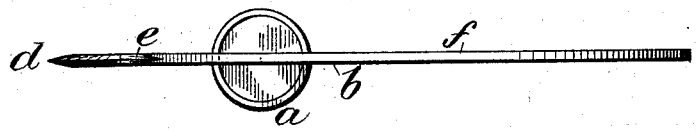
Witnesses:—
D. N. Hayford
F. M. Eggleston
Inventor:—
James Carpenter
By Redding & Kiddle
Attorneys

UNITED STATES PATENT OFFICE.

JAMES CARPENTER, OF BROOKLYN, NEW YORK.

COMBINED CUTTING-TOOL.

SPECIFICATION forming part of Letters Patent No. 541,963, dated July 2, 1895.

Application filed September 28, 1894. Serial No. 524,415. (No model.)

*To all whom it may concern:*

Be it known that I, JAMES CARPENTER, a citizen of the United States, and a resident of the city of Brooklyn, county of Kings, State of New York, have invented certain new and useful Improvements in a Combined Cutting-Tool, of which the following is a specification, reference being had to the accompanying drawings, forming part hereof.

This invention relates to cutting tools and particularly to that class of cutting tools employed in connection with gardening and agriculture, and has for its object to provide a tool which will perform all the usual functions of a sickle and in addition thereto can be used for cutting or chopping either against or upon a flat surface or otherwise, and can be employed for cutting out weeds or pruning or trimming and in other gardening and agricultural work and for other purposes.

The combined cutting tool embodying my invention is provided with a suitable handle and resembles in outline the ordinary sickle, having a long concavely curved and sharpened inner edge at one side of the blade, but departs from the sickle form in that another cutting edge is formed at what would be the back of the sickle. This latter cutting edge is substantially straight or of slight convex curvature resembling a hatchet edge, and this hatchet edge is joined to the back of the sickle part of the blade by an inclined and sharpened edge which co-operates with the hatchet edge to form a sharp tooth and co-operates with the back of the sickle part to form a wedge-shaped opening. The inner concavely curved cutting edge can be used for cutting grass and for all the uses of a sickle and can be thus used with practically the same facility as if the tool were nothing else than a sickle. The hatchet edge on the opposite side of the tool can be used for chopping or cutting against a flat or other cutting surface and for all the uses of an ordinary hatchet or chopper, and whenever a convexly curved or substantially straight cutting edge is desired. The sharp tooth at the outer end of the hatchet edge can be used in cutting out weeds and for other purposes, and the inclined edge of this tooth can be used for trimming and pruning and for many other purposes. In cutting grass it is frequently desirable to have a chopping cutter or a cutter with a substantially straight edge for trimming around borders and for other purposes and it is evident that with my improved combined cutting tool it is only necessary to turn the tool in the hand and use the hatchet edge for these purposes. It is also frequently desirable to cut out weeds from the lawn, and this is provided for by the tooth above mentioned, and the operation of cutting out weeds may be readily performed by the gardener upon simply turning the tool in his hand and pushing the cutter tooth in the ground, and the cutter tooth is so guarded and guided that this work of cutting out weeds can be performed without injury to the lawn. The functions of the three characters of cutting edge combined in my tool are frequently all required in one piece of work, as in the trimming of a lawn, and it is therefore highly advantageous to have all these functions combined in a single tool.

The accompanying drawings illustrate an embodiment of my invention.

Figure 1 is an elevation or face view of the complete tool. Fig. 2 is a plan or edge view of the same. Fig. 3 is an enlarged transverse section of the same on the line 3 3 of Fig. 2.

The combined cutting tool comprises a handle $a$ which may be of any suitable construction so as to be conveniently and readily grasped and held in the hand of the user, and the blade $b$ which is usually of hardened steel and set within the handle or otherwise suitably and firmly attached thereto. It is of course evident that the handle and blade may be made in one piece if desired. The blade $b$ resembles in outline an ordinary sickle and has a concavely curved cutting edge $c$ at one side thereof which corresponds in all respects to an ordinary sickle edge, but at the other side of the blade and at what would be the back of the sickle, another cutting edge $d$ is formed substantially straight or convexly curved in outline and resembling a hatchet edge, and as shown the hatchet edge at its point nearest to the handle $a$ departs but slightly from what would be the usual form of the back of the sickle, so that there is no abrupt corner at this end of the hatchet edge, but at the outer end of the hatchet edge $d$ the terminating point is some distance from what would be the back of the sickle and a cutting edge e sharply inclined to the hatchet edge d joins the outer end of the hatchet edge with an edge f preferably blunt and unsharpened and corresponding with the ordinary back of a sickle. The edge e is sharpened and is inclined at an acute angle to the back f so that a wedge-shaped opening is formed at this point. The sharp tooth formed by the inclined cutting edge e and the outer portion of the hatchet edge d is the weed cutter, and the blunt back f acts as a guard to the weed cutter, sliding over the ground without injury to the lawn and regulating the penetration of the tooth so that the weed will be severed at the crown of its root without injury to the lawn; and the blunt convexly curved back of the sickle also acts as a guide and fulcrum in this operation of cutting out weeds, and it will be seen that this tooth extends forwardly and away from the handle so as to to be operated by a thrusting movement of the tool, and thus when the operator wishes to cut out a weed he thrusts the tool downwardly and forwardly thereby slightly penetrating the ground and cutting off the weed at the crown of its root and thus effectually killing the weed, and the inclined cutting edge e acting in the wedge shaped opening forms the pruning knife of the combined tool and it will be seen, is so located that a thrusting movement will cause it to grasp and cut protruding twigs, branches and stems, thus making a highly effective pruner or trimmer.

It will be seen that the combined cutting tool above described is of exceedingly simple and compact construction and but slightly larger than an ordinary sickle. The cutting edges are all convenient of access and may be readily ground and sharpened.

The tool combines in itself the capability of performing substantially all of the cutting operations required in trimming lawns and gardens, so that a gardener supplied with this single tool may rapidly perform all this work, employing the tool to perform any one of the desired functions and readily changing the tool from one position to another by simply turning it in his hand.

In the work of cutting or trimming lawns it is frequently desirable to be able to chop or cut against a flat surface or otherwise to employ a chopping function or a straight cutting edge, and with my improved combined tool the gardener is enabled to do this work readily and quickly and without any additional tool or the trouble of handling additional tools. So also in cutting or trimming lawns it is desirable to cut out weeds, and with my improved combined tool the gardener is enabled to do this work by simply thrusting the sickle so that the sharp tooth will enter the ground at the place where the weed is growing, and the tooth will cut off the weed so as to effectually kill it, the blunt back edge f acting as a guide and guard as above set forth.

It is of course evident that the form and contour of my improved combined cutting tool may be varied without departing from my invention and that for some purposes it may not be necessary to provide one or the other of the three cutting edges above described and that the contour of these cutting edges may be modified without departing from my invention. I do not therefore limit myself to the particular construction shown in the drawings, but

What I claim, and desire to secure by Letters Patent, is—

1. A combined cutting tool having a curved sickle edge at one side of the blade and having at the other side of the blade a projecting cutter tooth and a blunt edge in proximity to said cutter tooth, said cutter tooth extending forward so as to be operated by a forwardly thrusting movement of the tool said blunt edge forming a guide and guard to the said cutter tooth, substantially as set forth.

2. A combined cutting tool having a curved sickle edge at one side of the blade, and having at the other side of the blade a forwardly projecting cutter tooth and a blunt edge contiguous thereto, said blunt edge and the adjacent edge of the cutter tooth forming an acute angle with each other, substantially as set forth.

3. A combined cutting tool having a concavely curved sickle edge c at one side of the blade, and a substantially straight hatchet edge d at the other side of the blade, said hatchet edge projecting slightly from the unsharpened back of the blade at its inner end and projecting a considerable distance therefrom at its outer end and the outer end of said hatchet edge d being joined to the blunt back of the tool by an inclined cutting edge e making an acute angle with the hatchet edge and an acute angle with the blunt back edge f of the tool, substantially as set forth.

4. A cutting tool having a concavely curved sickle edge at one side of the blade and having at the other side of the blade a hatchet edge terminating outwardly in a cutter tooth, and having a blunt convexly curved edge beyond said cutter tooth, one edge of said cutter tooth being inclined at an acute angle to said blunt edge, and said blunt edge forming a guide and guard to said cutter tooth, substantially as set forth.

5. A cutting tool having a curved sickle edge at one side of the blade and a projecting cutter tooth at the other side of the blade, the edge of said blade being blunt at the side of the blade containing the cutter tooth from said cutter tooth to the outer end of the blade, substantially as set forth.

This specification signed and witnessed this 22d day of September, A. D. 1894.

JAMES CARPENTER.

Witnesses:
HENRY D. WILLIAMS,
F. M. EGGLESTON.